US012645330B2

(12) United States Patent
Yuk et al.

(10) Patent No.: US 12,645,330 B2
(45) Date of Patent: Jun. 2, 2026

(54) DISPLAY DEVICE

(71) Applicant: SAMSUNG DISPLAY CO., LTD.,
Yongin-si (KR)

(72) Inventors: Bo Geun Yuk, Yongin-si (KR); **Min
Hong Kim, Yongin-si (KR); Mi Ae
Park, Yongin-si (KR); Ga Yeon Yun**,
Yongin-si (KR)

(73) Assignee: SAMSUNG DISPLAY CO., LTD.,
Yongin-si (KR)

( * ) Notice: Subject to any disclaimer, the term of this
patent is extended or adjusted under 35
U.S.C. 154(b) by 62 days.

(21) Appl. No.: 18/761,512

(22) Filed: Jul. 2, 2024

(65) Prior Publication Data

US 2025/0021197 A1     Jan. 16, 2025

(30) Foreign Application Priority Data

Jul. 14, 2023     (KR) ......................... 10-2023-0091911

(51) Int. Cl.
*G06F 3/044*          (2006.01)
(52) U.S. Cl.
CPC .. *G06F 3/0443* (2019.05); *G06F 2203/04101*
(2013.01)
(58) Field of Classification Search
None
See application file for complete search history.

(56) References Cited

U.S. PATENT DOCUMENTS

| | | | |
|---|---|---|---|
| 7,050,135 B2 | 5/2006 | Kim | |
| 10,545,363 B2 | 1/2020 | Hwang et al. | |
| 11,669,183 B2 | 6/2023 | Cho | |
| 2009/0102773 A1* | 4/2009 | Um | G09G 3/3659 |
| | | | 345/92 |
| 2022/0045302 A1* | 2/2022 | Xu | H10K 59/124 |
| 2022/0164051 A1 | 5/2022 | Lee et al. | |
| 2022/0285449 A1 | 9/2022 | Park et al. | |
| 2024/0122019 A1 | 4/2024 | Yun et al. | |

FOREIGN PATENT DOCUMENTS

| | | | |
|---|---|---|---|
| CN | 109799641 B | * | 10/2021 |
| CN | 115903297 A | * | 4/2023 |
| KR | 10-0806808 B1 | | 2/2008 |
| KR | 10-1712246 B1 | | 3/2017 |
| KR | 10-2022-0073296 A | | 6/2022 |
| KR | 10-2022-0125855 A | | 9/2022 |
| KR | 10-2023-0020049 A | | 2/2023 |
| KR | 10-2024-0048079 A | | 4/2024 |

* cited by examiner

*Primary Examiner* — Duane N Taylor, Jr.
(74) *Attorney, Agent, or Firm* — F. CHAU &
ASSOCIATES, LLC

(57)          ABSTRACT

A display device including: a display panel including a
display area; and a touch array disposed on the display
panel, wherein the display panel includes: a substrate; tran-
sistors disposed on the substrate; an insulating layer cover-
ing first electrodes and second electrodes of the transistors;
light emitting elements disposed on the insulating layer, the
light emitting elements being electrically connected to the
first electrodes of the transistors; and a thin film encapsu-
lation layer covering the light emitting elements, wherein
the display area is divided into a plurality of sub-areas, and
wherein the insulating layer has different thicknesses in the
plurality of sub-areas.

20 Claims, 8 Drawing Sheets

DP

| | |
|---|---|
| THIN FILM ENCAPSULATION LAYER | ~TFE |
| DISPLAY ELEMENT LAYER | ~DPL |
| PIXEL CIRCUIT LAYER | ~PCL |
| SUBSTRATE | ~SUB |

I                                    I'

DR3

TS_INS2
CPL2
TS_INS1    TS
CPL1
BSL
TFE

TFE

PDL 110
104
102
SUB

PCL

II                                                                    II'

DR3                TR3                T                TR2                105 101 103 106

TR1

DISPLAY DEVICE

CROSS-REFERENCE TO RELATED APPLICATION

The present application claims priority under 35 U.S.C. § 119(a) to Korean patent application No. 10-2023-0091911 filed on Jul. 14, 2023 in the Korean Intellectual Property Office, the disclosure of which is incorporated by reference herein in its entirety.

1. TECHNICAL FIELD

The present disclosure generally relates to a display device that supports a touch function, and more particularly, to a display device that senses a touch of a user, using touch electrodes.

2. DISCUSSION OF RELATED ART

With the increasing use of mobile electronic devices such as smartphones and tablet computers, display devices equipped with touch electrodes on their panels for touch sensing have become widespread. Recently, there has been a growing demand for display devices that can recognize touch input. These devices either have a touch sensor attached to one surface of a display panel or are manufactured integrally with the display panel.

However, noise that can influence the signal of a touch sensor may be generated by a display panel. This noise can lead to a decrease in the touch sensor's sensing sensitivity, potentially impairing the reliability and performance of both the display device and associated electronic devices.

SUMMARY

Embodiments of the present disclosure provide a display device designed to recognize a touch input with improved reliability by reducing the impact of display noise on a touch sensor. For example, the display device can minimize or at least reduce noise which may be introduced to a touch array from a display panel.

In accordance with an embodiment of the present disclosure, there is provided a display device including: a display panel including a display area; and a touch array disposed on the display panel, wherein the display panel includes: a substrate; transistors disposed on the substrate; an insulating layer covering first electrodes and second electrodes of the transistors; light emitting elements disposed on the insulating layer, the light emitting elements being electrically connected to the first electrodes of the transistors; and a thin film encapsulation layer covering the light emitting elements, wherein the display area is divided into a plurality of sub-areas, and wherein the insulating layer has different thicknesses in the plurality of sub-areas.

The thicknesses of the insulating layer in the plurality of sub-areas are determined based on noise levels in signals of the touch array, wherein the noise levels are caused by electrical signals in the plurality of sub-areas when the display device is driven.

The thicknesses of the insulating layer in the plurality of sub-areas are set so that noise levels, which are respectively caused by electrical signals in the plurality of sub-areas, become uniform.

The display area has long sides which are disposed in parallel to each other and are spaced apart from each other in a first direction and short sides which are disposed in parallel to each other and are spaced apart from each other in a second direction intersecting the first direction, wherein the plurality of sub-areas include a first sub-area, a second sub-area, and a third sub-area, which are sequentially arranged in the first direction, and wherein the thickness of the insulating layer in the second sub-area is thicker than each of the thicknesses of the insulating layer in the first sub-area and the third sub-area.

The display area has long sides which are disposed in parallel to each other and are spaced apart from each other in a first direction and short sides which are disposed in parallel to each other and are spaced apart from each other in a second direction intersecting the first direction, wherein the plurality of sub-areas include a first sub-area and a second sub-area, which are sequentially arranged in the second direction, and wherein the thickness of the insulating layer in the first sub-area is thicker than the thickness of the insulating layer in the second sub-area.

Each of the light emitting elements includes: a pixel electrode disposed on the insulating layer, the pixel electrode being electrically connected to one of the first electrodes of the transistors; a light emitting layer disposed on the pixel electrode; and a common electrode disposed on the light emitting layer.

The insulating layer includes an organic material.

The insulating layer has a thickness in a range of 1 μm to 3 μm.

In accordance with an embodiment of the present disclosure, there is provided a display device including: a display panel including a display area; and a touch array disposed on the display panel, wherein the display panel includes: a circuit element layer including a plurality of transistors; light emitting elements disposed on the pixel circuit layer, the light emitting elements being respectively connected to the plurality of transistors; and an insulating layer disposed between the pixel circuit layer and the light emitting elements, wherein the display area includes a plurality of sub-areas, and wherein the insulating layer has different thicknesses in the plurality of sub-areas.

The thicknesses of the insulating layer in the plurality of sub-areas are determined based on noise levels in signals of the touch array, wherein the noise levels are caused by electrical signals in the plurality of sub-areas when the display device is driven.

The thicknesses of the insulating layer in the plurality of sub-areas are set so that noise levels, which are respectively caused by electrical signals in the plurality of sub-areas, become uniform.

The display area has first sides which are disposed in parallel to each other and are spaced apart from each other in a first direction and second sides which are disposed in parallel to each other and are spaced apart from each other in a second direction intersecting the first direction, wherein the plurality of sub-areas include a first sub-area, a second sub-area, and a third sub-area, which are sequentially arranged in the first direction, and wherein the thickness of the insulating layer in the second sub-area is thicker than each of the thicknesses of the insulating layer in the first sub-area and the third sub-area.

The display area has first sides which are disposed in parallel to each other and are spaced apart from each other in a first direction and second sides which are disposed in parallel to each other and are spaced apart from each other in a second direction intersecting the first direction, wherein the plurality of sub-areas include a first sub-area and a second sub-area, which are sequentially arranged in the second direction, and wherein the thickness of the insulating layer in the first sub-area is thicker than the thickness of the insulating layer in the second sub-area.

The display panel further includes a thin film encapsulation layer covering the light emitting elements.

Each of the light emitting elements includes: a pixel electrode disposed on the insulating layer, the pixel electrode being electrically connected to one first electrode of one of the transistors; a light emitting layer disposed on the pixel electrode; and a common electrode disposed on the light emitting layer.

In accordance with an embodiment of the present disclosure, there is provided a display device including: a display panel including a display area; and a touch array disposed on the display panel, wherein the display panel includes: a substrate; transistors disposed on the substrate; an insulating layer covering the transistors; light emitting elements disposed on the insulating layer, the light emitting elements being electrically connected to the transistors; and a thin film encapsulation layer covering the light emitting elements, wherein the display area includes a first sub-area and a second sub-area, and wherein the insulating layer has a different thicknesses in the first sub-area and the second sub-area.

The display area further includes a third sub-area.

The first, second and third sub-areas are arranged in sequence and the thickness of the second sub-area is greater than the thickness of the first sub-area and a thickness of the third sub-area.

The first, second and third sub-areas are arranged in sequence and the thickness of each of the first and second sub-areas is greater than a thickness of the third sub-area.

The first and second sub-areas have the same thickness.

BRIEF DESCRIPTION OF THE DRAWINGS

FIG. 7 is a sectional view taken along line II-II' shown in FIG. 6.

DETAILED DESCRIPTION OF THE EMBODIMENTS

Figure 1:
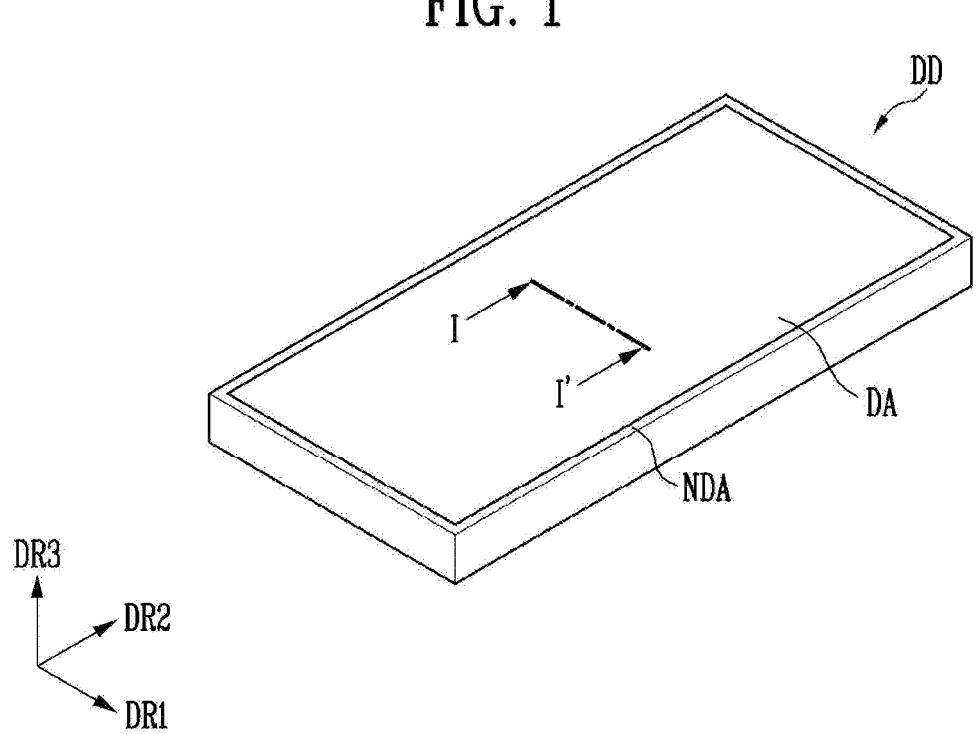
FIG. 1 is a perspective view illustrating a display device in accordance with embodiments of the present disclosure.

Embodiments of the present disclosure will now be described more fully hereinafter with reference to the accompanying drawings. However, however, the present disclosure may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals may refer to like elements throughout.

In the specification, when an element is referred to as being "connected" or "coupled" to another element, it can be directly connected or coupled to the another element or be indirectly connected or coupled to the another element with one or more intervening elements interposed therebetween. The technical terms used herein are used for the purpose of illustrating a specific embodiment and are not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are used to distinguish one element from another element. Thus, a "first" element discussed below could also be termed a "second".

FIG. 1 is a perspective view illustrating a display device in accordance with embodiments of the present disclosure.

Referring to FIG. 1, the display device DD may include an electronic device in which a display surface is applied to at least one surface thereof. The electronic device may be a smartphone, a television, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, or a wearable device.

The display device DD may be provided in various shapes. In an example, the display device DD may be provided in a rectangular plate shape having two pairs of sides parallel to each other, but the present disclosure is not limited thereto. When the display device DD is provided in the rectangular plate shape, any one pair of sides among the two pairs of sides may be provided longer than the other pair of sides. In FIG. 1, it is illustrated that the display device DD has at least one angular corner portion formed by lines. However, the present disclosure is not limited thereto. In some embodiments, in the display device DD provided in the rectangular plate shape, at least one corner portion at which one long side and one short side are in contact with each other may have a round shape.

In embodiments, the display device DD may have a rectangular shape having a pair of long sides and a pair of short sides as shown in FIG. 1. An extending direction of the long side may be a second direction DR2, an extending direction of the short side may be a first direction DR1, and a direction perpendicular to the extending directions of the long side and the short side may be a third direction DR3.

In embodiments, at least a portion of the display device DD may have flexibility, and the display device DD may be folded at the portion having flexibility. For example, the display device DD may include a bending area.

The display device DD may include a display area DA in which an image is displayed and a non-display area NDA disposed at the periphery of the display area DA. The non-display area NDA is an area in which the image is not displayed. However, the present disclosure is not limited thereto. In some embodiments, the shape of the display area DA and the shape of the non-display area NDA may be relatively designed.

Figure 2:
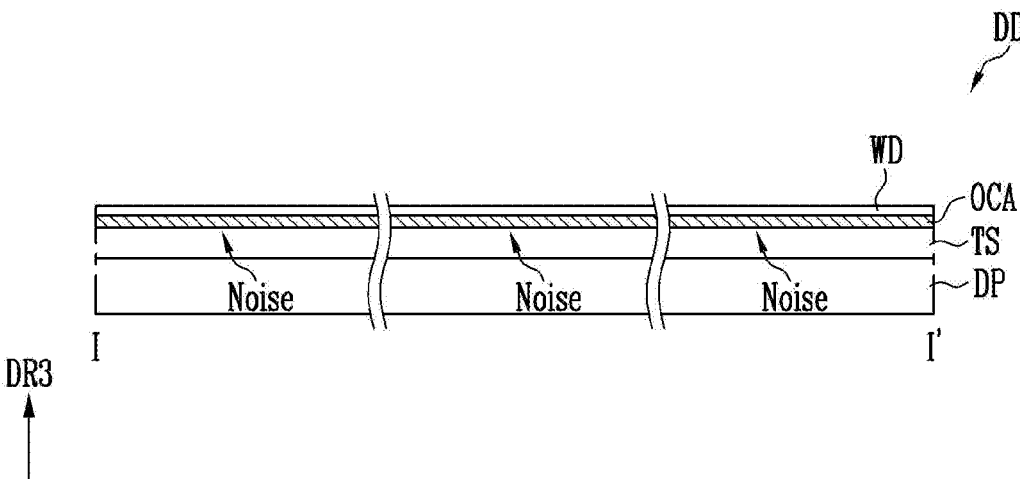
FIG. 2 is a sectional view taken along line I-I' shown in FIG. 1.

FIG. 2 is a sectional view taken along line I-I' shown in FIG. 1.

Referring to FIG. 2, the display device DD may include a display panel DP, a touch sensor TS, and a window WD.

The display panel DP may display an image through the display area DA shown in FIG. 1. In embodiments, the display panel DP may include at least one of self-luminescent display panels, such as an Organic Light Emitting Display panel (OLED panel) using an organic light emitting diode as a light emitting element, a nano-scale LED display panel using a nano-scale LED as a light emitting element, and a Quantum Dot Organic Light Emitting Display panel (QD OLED panel) using a quantum dot and an organic light emitting diode. Additionally, the display panel DP may include at least one of non-self-luminescent display panels, such as a Liquid Crystal Display panel (LCD panel), an Electro-Phoretic Display panel (EPD panel), and an Electro-Wetting Display panel (EWD panel).

The touch sensor TS may be disposed directly on a surface of the display panel DP, on which an image is displayed, to receive a touch input and/or a hovering input of a user. The touch sensor TS may include an array of touch electrodes (hereinafter, referred to as a touch array). That the touch sensor TS is "disposed directly" may exclude that the touch sensor TS is attached to the surface of the display panel DP using a separate adhesive layer (or glue layer), and mean that the touch sensor TS is formed through a continuous process. The touch sensor TS may recognize a touch input and/or a hovering input of the display device DD by sensing a touch capacitance caused by contact and/or proximity of a hand of the user or a separate input means similar thereto, such as a conductor. The touch input may mean that the touch sensor TS is directly touched (or contacted) by the hand of the user or the separate input means. The hovering input may mean that the hand of the user or the separate input means is in the vicinity of the display device DD including the touch sensor TS but does not touch the display device DD including the touch sensor TS.

However, since the touch sensor TS is disposed on the display panel DP, display noise Noise can arise in the signal of the touch sensor TS due to an electrical signal applied to the display panel DP for image display. The display noise Noise may influence a touch signal, thereby resulting in malfunction of the touch sensor TS or deterioration of the sensing sensitivity of the touch sensor TS.

The window WD for protecting an exposed surface of the display panel DP and the touch sensor TS may be disposed on the display panel DP and the touch sensor TS. The window WD may protect the display panel DP and the touch sensor TS from external impact, and provide the user with an input surface and/or a display surface. The window WD may be coupled to the display panel DP and the touch sensor TS, using an optically clear adhesive (or glue) member (OCA).

The window WD may have a multi-layer structure selected from a glass substrate, a plastic film, and a plastic substrate. The multi-layer structure may be formed through a continuous process or an adhesion process using an adhesive layer. The whole or a portion of the window WD may have flexibility.

Figure 3:
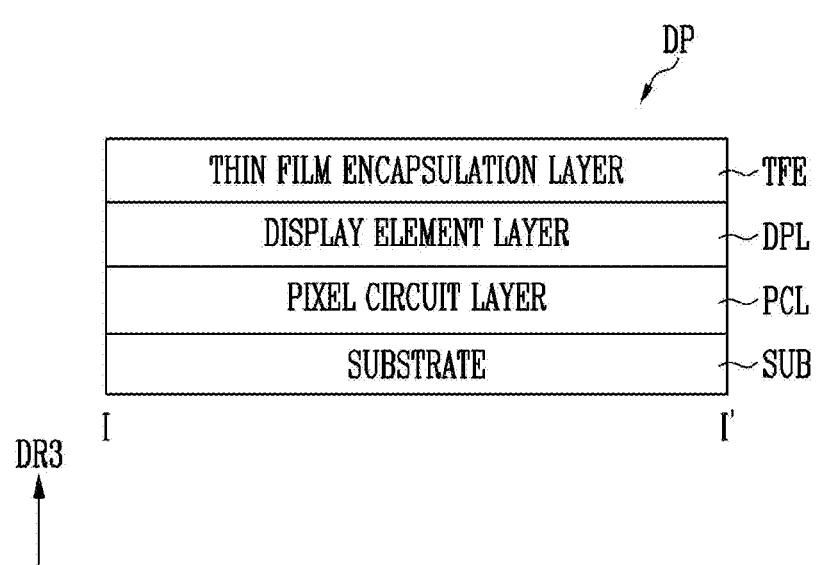
FIG. 3 is a sectional view illustrating an embodiment of a display panel shown in FIG. 2.

FIG. 3 is a sectional view illustrating an embodiment of the display panel shown in FIG. 2.

Referring to FIG. 3, the display panel DP may include a substrate SUB, a pixel circuit layer PCL, a display element layer DPL, and a thin film encapsulation layer TFE. The substrate SUB, the pixel circuit layer PCL, the display element layer DPL, and the thin film encapsulation layer TFE may be arranged in sequence.

The substrate SUB may be a rigid substrate or a flexible substrate. When the substrate SUB is the rigid substrate, the substrate SUB may be one of a glass substrate, a quartz substrate, a glass ceramic substrate, and a crystalline glass substrate. When the substrate SUB is the flexible substrate, the substrate SUB may be one of a film substrate and a plastic substrate, including a polymer organic material. Additionally, the substrate SUB may include a fiber glass reinforced plastic (FRP).

The pixel circuit layer PCL may be disposed on the substrate SUB. A plurality of thin film transistors and lines connected to the thin film transistors may be disposed in the pixel circuit layer PCL. For example, each thin film transistor may have a structure in which a semiconductor layer, a gate electrode, and source/drain electrodes are sequentially stacked with an insulating layer interposed therebetween. The semiconductor layer may include amorphous silicon, poly-silicon, low temperature poly-silicon, and an organic semiconductor. The gate electrode and the source/drain electrodes may include one of aluminum (Al), copper (Cu), titanium (Ti), and molybdenum (Mo), but the present disclosure is not limited thereto. Additionally, the pixel circuit layer PCL may include at least one insulating layer.

The display element layer DPL may be disposed on the pixel circuit layer PCL. The display element layer DPL may include light emitting elements for emitting light. Each of the light emitting elements may be an organic light emitting diode, but the present disclosure is not limited thereto. In some embodiments, each of the light emitting elements may be an inorganic light emitting element including an inorganic light emitting material or a light emitting element (quantum dot display element) that emits light by changing a wavelength of emitted light using a quantum dot. The organ light emitting diode may be provided, for example, in a form in which an anode electrode, a hole transport layer, an organic light emitting layer, an electron transport layer, and a cathode electrode are sequentially stacked, but the present disclosure is not limited thereto.

The thin film encapsulation layer TFE may be disposed on the display element layer DPL. The thin film encapsulation layer TFE may be an encapsulation substrate or be provided in the form of an encapsulation layer provided as a multi-layer. When the thin film encapsulation layer TFE is proved in the form of the encapsulation layer, the thin film encapsulation layer TFE may include an inorganic layer and/or an organic layer. For example, the thin film encapsulation layer TFE may have a structure in which an inorganic layer, an organic layer, and an inorganic layer are sequentially stacked. The thin film encapsulation layer TFE may prevent external air and external moisture from infiltrating into the display element layer DPL and the pixel circuit layer PCL.

Figure 4:
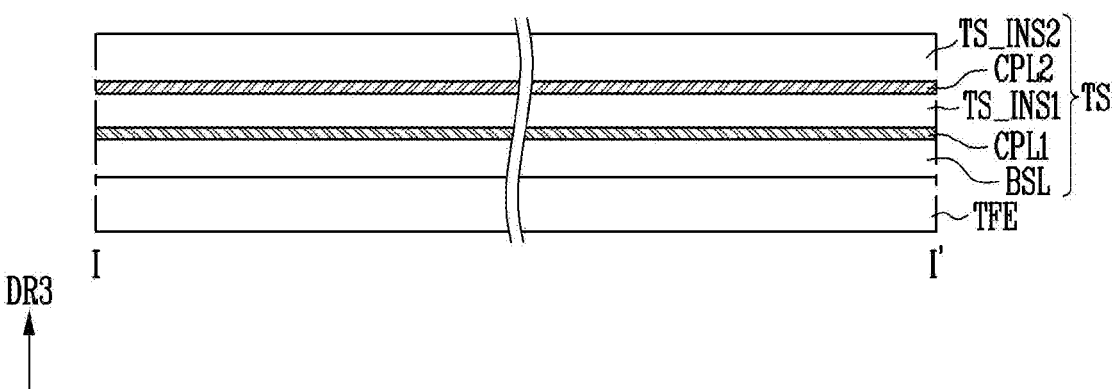
FIG. 4 is a sectional view illustrating an embodiment of a touch sensor shown in FIG. 2.

FIG. 4 is a sectional view illustrating an embodiment of the touch sensor shown in FIG. 2.

Referring to FIG. 4, the touch sensor TS may have a multi-layer structure. The touch sensor TS may include at least one conductive layer and include at least one insulating layer.

The touch sensor TS may include a base layer BSL, a first conductive layer CPL1, a first insulating layer TS_INS1, a second conductive layer CPL2, and a second insulating layer TS_INS2.

The first conductive layer CPL1 may be disposed directly on the thin film encapsulation layer TFE of the display panel DP, but the present disclosure is not limited thereto. In some embodiments, another insulating layer, e.g., the base layer BSL may be disposed between the first conductive layer CPL1 and the thin film encapsulation layer TFE. The first conductive layer CPL1 may be disposed directly on the base layer BSL.

The first insulating layer TS_INS1 may be disposed on the first conductive layer CPL1. For example, the first insulating layer TS_INS1 may be disposed directly on the first conductive layer CPL1. The second conductive layer CPL2 may be disposed on the first insulating layer TS_INS1. For example, the second conductive layer CPL2 may be disposed directly on the first insulating layer TS_INS1. The second insulating layer TS_INS2 may be disposed on the second conductive layer CPL2. For example, the second insulating layer TS_INS2 may be disposed directly on the second conductive layer CPL2.

Each of the first and second conductive layers CPL1 and CPL2 may have a single-layer structure, or have a multi-layer structure in which layers are stacked in a thickness direction, e.g., the third direction DR3. The conductive layer having the single-layer structure may include a conductive material. For example, the conductive material may include a metal such as molybdenum (Mo), silver (Ag), titanium (Ti), copper (Cu), aluminum (Al), or any alloy thereof, or include a transparent conductive oxide such as indium tin oxide (ITO), indium zinc oxide (IZO), zinc oxide (ZnO), or indium tin zinc oxide (ITZO).

The conductive layer having the multi-layer structure may include multiple metal layers. The multiple metal layers may have, for example, a triple structure of titanium (Ti)/aluminum (Al)/titanium (Ti), but the present disclosure is not limited thereto. The conductive layer having the multi-layer structure may include multiple metal layers and a transparent conductive layer.

Figure 5:
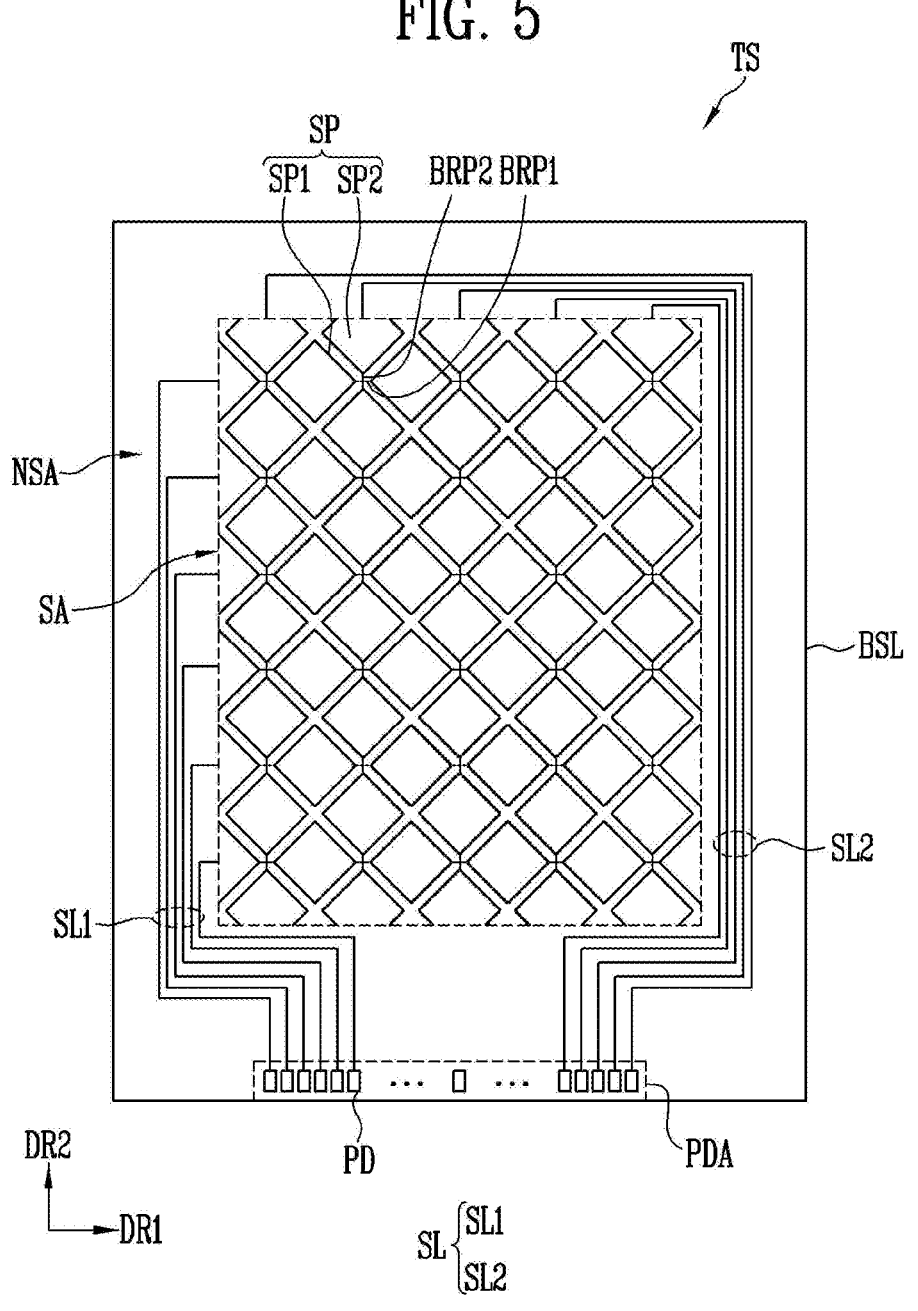
FIG. 5 is a plan view illustrating an embodiment of the touch sensor shown in FIG. 4.

In embodiments, each of the first and second conductive layers CPL1 and CPL2 may include sensor patterns (see SP1 and SP2 shown in FIG. 5) and scan lines (see SL1 and SL2 shown in FIG. 5).

Each of the first and second insulating layers TS_INS1 and TS_INS2 may include an inorganic material or an organic material. The inorganic material may include at least one of silicon nitride ($SiN_x$), silicon oxide ($SiO_x$), silicon oxynitride (SiON), and a metal oxide such as aluminum oxide ($AlO_x$). The organic material layer may include at least one of an acryl-based resin, a metacryl-based an acryl-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

FIG. 5 is a plan view illustrating an embodiment of the touch sensor shown in FIG. 4.

Referring to FIGS. 1, 4, and 5, the touch sensor TS (or the base layer BSL) may include a sensor area SA (e.g., sensing area, or active area) capable of sensing a touch input and a non-sensor area NSA (or non-sensing area) surrounding at least a portion of the sensor area SA.

The base layer BSL may be made of tempered glass, a transparent plastic, a transparent film, or the like. In some embodiments, the base layer BSL may be omitted.

The sensor area SA may be provided in a central area of the base layer BSL to overlap with the display area DA (see FIG. 1). The sensor area SA may be provided in a shape substantially identical to the shape of the display area DA, but the present disclosure is not limited thereto. A sensor electrode for sensing a touch input may be provided and/or formed in the sensor area SA.

The non-sensor area NSA may be provided in a peripheral area of the base layer BSL to overlap with the non-display area NDA (see FIG. 1). The peripheral area may be one area surrounding the central area of the base layer BSL. A sensing line SL electrically connected to the sensor electrode to receive and transfer a sensing signal may be provided and/or formed in the non-sensor area NSA. In addition, a pad part PDA connected to the sensing line SL to be electrically connected to the sensor electrode of the sensor area SA may be disposed in the non-sensor area NSA. The pad part PDA may include at least one pad PD. The sensing line SL may include a plurality of first sensing lines SL1 and a plurality of second sensing lines SL2.

The sensor electrode may include a plurality of sensor patterns SP and first and second bridge patterns BRP1 and BRP2.

The sensor patterns SP may include a plurality of first sensor patterns SP1 (or first sensor electrodes) and a plurality of second sensor patterns SP2 (or second sensor electrodes) electrically connected to the first sensor patterns SP1.

The first sensor pattern SP1 may be arranged in the first direction DR1, and be electrically connected to adjacent first sensor patterns SP1 through the first bridge patterns BRP1, to constitute at least one sensor row. The second sensor patterns SP2 may be arranged in the second direction DR2 intersecting the first direction DR1, and be electrically connected to adjacent second sensor patterns SP2 through the second bridge patterns BRP2, to constitute at least one sensor column.

Each of the first and second sensor patterns SP1 and SP2 may be electrically connected to one pad PD through a corresponding sensing line SL. In an example, first sensor patterns SP1 may be electrically connected to one pad PD through each of the first sensing lines SL1, and second sensor patterns SP2 may be electrically connected to one pad PD through each of the second sensing lines SL2.

The first sensor patterns SP1 may correspond to a driving electrode that receives a driving signal for detecting a touch position in the sensor area SA, and the second sensor patterns SP2 may correspond to a sensing electrode that outputs a sensing signal for detecting a touch position in the sensor area SA. However, the present disclosure is not limited thereto. The first sensor patterns SP1 may correspond to the sensing electrode and the second senor patterns SP2 may correspond to the driving electrode.

In the embodiment of the present disclosure, the touch sensor TS senses a variation of mutual capacitance formed between the first and second sensor patterns SP1 and SP2, thereby recognizing a touch of a user.

Figure 6:
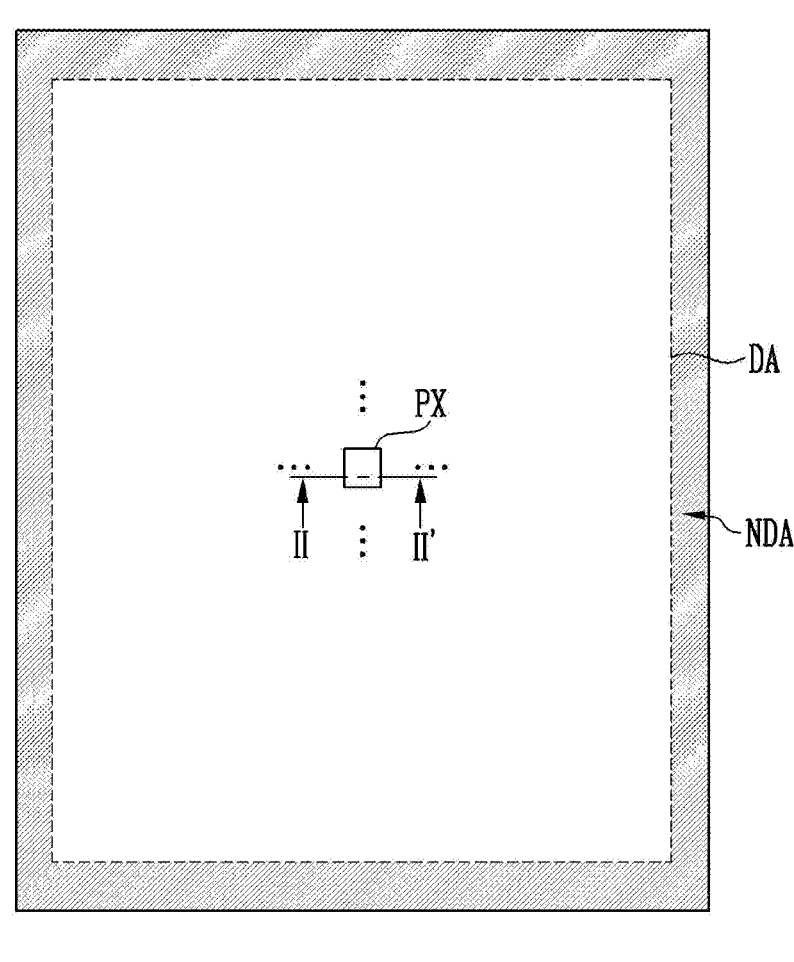
FIG. 6 is a plan view illustrating an embodiment of the display panel shown in FIG. 2.

FIG. 6 is a plan view illustrating an embodiment of the display panel shown in FIG. 2.

Referring to FIG. 6, the display area DA of the display device DD may be an area in which pixels PX are disposed. The display area DA may be an area in which light emitting elements are disposed. For example, the display area DA may overlap with the pixels PX (or the light emitting elements) when viewed on a plane. The pixels PX may be arranged in a matrix form in the first direction DR1 and the second direction DR2. Scan lines extending in the first direction DR1 and data lines extending in the second direction DR2 may be further disposed in the display area DA.

The non-display area NDA of the display device DD may be an area in which the pixels PX are not disposed. At least one line and at least one pad, which are electrically connected to the pixels PX, may be disposed in the non-display area NDA.

Figure 7:
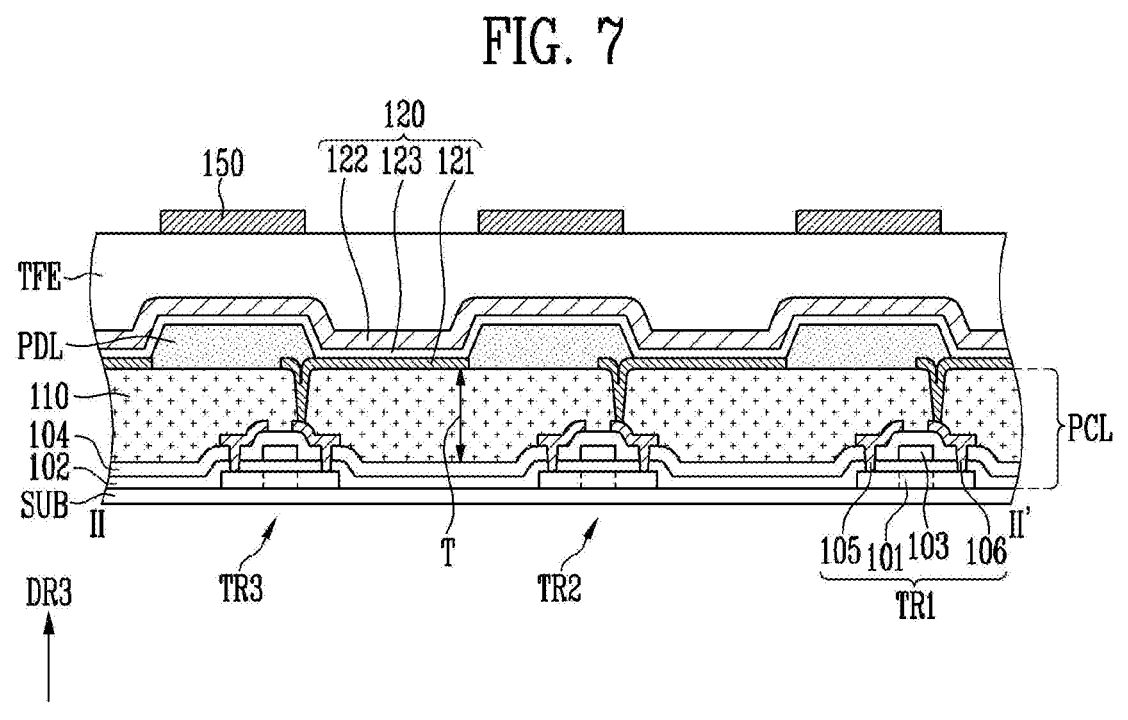

FIG. 7 is a sectional view taken along line II-II' shown in FIG. 6.

Referring to FIG. 7, the display device DD may include a substrate SUB, a plurality of transistors TR1, TR2, and TR3 disposed on the substrate SUB, and light emitting elements 120. The display device DD may include touch electrodes 150 spaced apart from the light emitting elements 120. Additionally, the display device DD may additionally have at least one capacitor for controlling light emission of the light emitting elements 120.

Each of the transistors TR1, TR2, and TR3 may include a semiconductor layer 101, a gate electrode 103, a source electrode 105, and a drain electrode 106.

The semiconductor layer 101 may be formed in a predetermined pattern on the substrate SUB. The semiconductor layer 101 may be formed of poly-silicon, amorphous silicon, an oxide semiconductor, or the like on the substrate SUB. A buffer layer for preventing the diffusion of an impurity contained in the substrate SUB may exist between the substrate SUB and the semiconductor layer 101.

A gate insulating layer 102 may be formed over the semiconductor layer 101. The gate insulating layer 102 may be made of an insulating material such as a silicon oxide layer or a silicon nitride layer.

The gate electrode 103 may be formed in a predetermined pattern on the gate insulating layer 102. An interlayer insulating layer 104 may be formed over the gate electrode 103.

The interlayer insulating layer 104 may be formed of a predetermined insulating material, like the gate insulating layer 102. However, the gate insulating layer 102 may insulate between the semiconductor layer 101 and the gate electrode 103, and the interlayer insulating layer 104 may insulate between the gate electrode 103 and the source and drain electrodes 105 and 106.

The source electrode 105 and the drain electrode 106 may be formed on the interlayer insulating layer 104. The source electrode 105 and the drain electrode 106 may be electrically connected to both sides of the semiconductor layer 101 through contact holes formed in the gate insulating layer 102 and the interlayer insulating layer 104, respectively.

The gate electrode 103, the source electrode 105, and the drain electrode 106 may be formed of a metal such as molybdenum (Mo), tungsten (W), titanium (Ti) or aluminum (Al), or any alloy or stacked structure thereof.

However, the transistors TR1, TR2, and TR3 shown in FIG. 7 are described as an example, and the structure of the transistors TR1, TR2, and TR3 is not limited thereto.

An insulating layer 110 may be a via insulating layer, and be disposed on the interlayer insulating layer 104 and the display area DA to cover the source electrode 105 and the drain electrode 106. A via hole may be formed in the insulating layer 110 such that a predetermined portion of each of the source electrode 105 and the drain electrode 106 is exposed. The insulating layer 110 may have a substantially flat top surface to sufficiently cover source and drain patterns, in other words, the source electrode 105 and the drain electrode 106.

The insulating layer 110 may include an inorganic insulating material such as a silicon compound or a metal oxide, or an organic insulating material. For example, the insulating layer 110 may be formed using an organic insulating material such as a photoresist, an acrylic-based resin, a polyamide-based resin, or a siloxane-based resin.

In accordance with an embodiment, the insulating layer 110 may have a predetermined thickness T that is determined by considering display noise, e.g., noise caused by electrical signals of the transistors TR1, TR2, and TR3. For example, when the thickness T of the insulating layer 110 is relatively small, the display device DD may be relatively thin. However, noise which may be included in a signal of the touch sensor TS due to the display noise may increase. When the thickness T of the insulating layer 110 is relatively large, the noise which may be included in the signal of the touch sensor due to the display noise may decrease. Thus, the display device DD may be relatively thick.

The thickness T of the insulating layer 110 may be a distance between the interlayer insulating layer 104 and the light emitting elements 120. For example, the thickness T of the insulating layer 110 may be a distance between the bottom of the insulating layer 104 and the bottom of a portion of the light emitting elements 120. In addition, a direction of the thickness T may be the third direction DR3 which is a normal direction of the display area DA.

The light emitting elements 120 may be disposed in the display area DA, and be electrically connected respectively to source electrodes of the transistors TR1, TR2, and TR3. Each of the light emitting elements 120 may include a pixel electrode 121, a light emitting layer 123, and a common electrode 122. The thickness T of the insulating layer 110 may be a distance between the bottom of the insulating layer 104 and the bottom of a portion of the pixel electrode 121.

The pixel electrode 121 (or an anode electrode) may be disposed on the insulating layer 110. The pixel electrode 121 may be electrically connected to each of the transistors TR1, TR2, and TR3 through a contact hole formed through the insulating layer 110. According to a type of the display device DD, the pixel electrode 121 may be formed using a material having reflectivity or a material having transmissivity. For example, the pixel electrode 121 may be formed in a single-layer structure or a multi-layer structure, which includes a metal layer, an alloy layer, a metal nitride layer, a conductive metal oxide layer, and/or a transparent conductive material.

A pixel defining layer PDL may be disposed on the insulating layer 110 on which the pixel electrode 121 is disposed. The pixel defining layer PDL may be formed using an organic material, an inorganic material, or the like. For example, the pixel defining layer PDL may be formed using a photoresist, a polyacrlic-based resin, a polyamide-based resin, an acrylic-based resin, a silicon compound, and the like. An opening partially exposing the pixel electrode 121 may be formed by etching the pixel defining layer PDL. An emission area and a non-emission area of the display device DD may be defined by the opening of the pixel defining layer PDL. For example, a portion at which the opening of the pixel defining layer PDL corresponds to the emission area, and the non-emission area may correspond to a portion adjacent to the opening of the pixel defining layer PDL.

The light emitting layer 123 may be disposed on the pixel electrode 121 exposed through the opening of the pixel defining layer PDL. Additionally, the light emitting layer 123 may extend onto a sidewall of the opening of the pixel defining layer PDL. For example, the light emitting layer 123 may have a multi-layer structure including an organic light emitting layer EL, a hole injection layer (HIL), a hole transport layer (HTL), an electron transport layer (ETL), an electron injection layer (EIL), and the like. Additionally, in the light emitting layer 123, the hole injection layer HIL, the hole transport layer HTL, the electron transport layer (ETL), the electron injection layer (EIL), and the like, except the organic light emitting layer EL, may be commonly formed to correspond to a plurality of pixels PX.

The organic light emitting layer EL of the light emitting layer 123 may be formed using light emitting materials capable of generating different colored lights such as red light, green light, and blue light according to the respective pixels PX of the display device DD. The light emitting layer 123 may be commonly formed to correspond to the plurality of pixels PX, and the pixels PX may be divided by a color filter layer.

The common electrode 122 (or a cathode electrode) may be disposed on the pixel defining layer PDL and the light emitting layer 123. According to the type of the display device DD, the common electrode 122 may include a material having transmissivity or a material having reflectivity. For example, like the pixel electrode 121, the common electrode 122 may be formed in a single-layer structure or a multi-layer structure, which includes a metal layer, an alloy layer, a metal nitride layer, a conductive metal oxide layer, and/or a transparent conductive material.

The light emitting elements 120 and the pixel defining layer PDL may be included in the display element layer DPL shown in FIG. 3.

A thin film encapsulation layer TFE may be disposed over the light emitting elements 120 to cover the light emitting elements 120. The thin film encapsulation layer TFE may be disposed between the light emitting elements 120 and the touch electrodes 150 to allow the light emitting elements 120 and the touch electrodes 150 to be spaced apart from each other at a predetermined distance. The thin film encapsulation layer TFE may be disposed over the common electrode 122 to prevent the infiltration of external moisture or external oxygen. The thin film encapsulation layer TFE may have at least one organic layer and at least one inorganic layer. The at least one organic layer and the at least one inorganic layer may be alternately stacked. For example, the thin film encapsulation layer TFE may include two inorganic layers and one organic layer therebetween, but the present disclosure is not limited thereto.

The touch electrodes 150 may be disposed on the thin film encapsulation layer TFE. The touch electrodes 150 may be conductive patterns of any one of the first conductive layer CPL1 and the second conductive layer CPL2, which are shown in FIG. 4.

Figure 8:
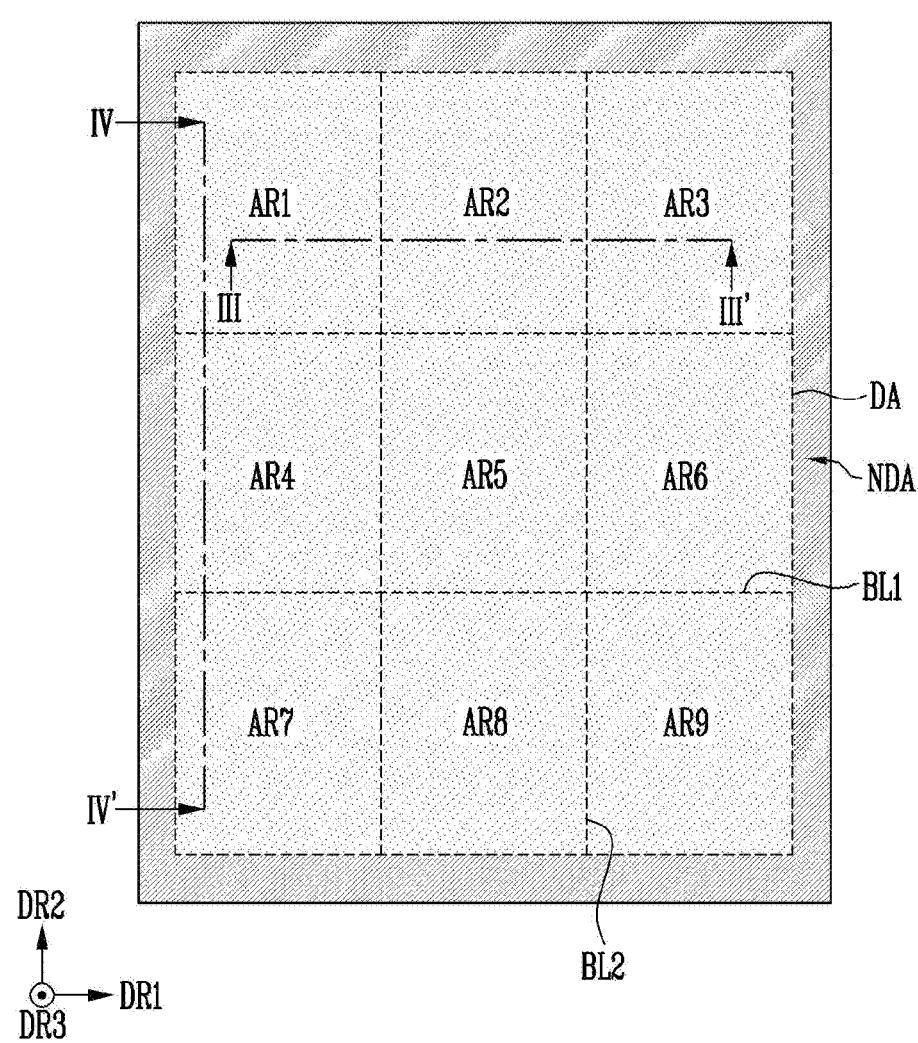
FIG. 8 is a plan view illustrating an embodiment of the display panel including a plurality of sub-areas.

FIG. 8 is a plan view illustrating an embodiment of the display panel including a plurality of sub-areas.

Referring to FIG. 8, the display area DA included in the display device DD may be divided into a plurality of sub-areas AR1, AR2, AR3, AR4, AR5, AR6, AR7, AR8 and AR9.

In accordance with an embodiment, the display area DA may have long sides which are disposed in parallel to each other and are spaced apart from each other in the first direction DR1 and short sides which are disposed in parallel to each other and are spaced apart from each other in the second direction DR2 intersecting the first direction DR1.

The first direction DR1 may be referred to as a row direction, and the second direction DR2 may be referred to as a column direction.

The display area DA may include the plurality of sub-areas AR1 to AR9 divided by boundary lines BL1 and BL2 in the first direction DR1 and the second directions DR2. The display area DA may be divided into a plurality of sub-areas by at least one boundary line BL1 dividing the long sides spaced apart from each other in the first direction DR1. Additionally, the display area DA may be divided into a plurality of sub-areas by at least one boundary line BL2 dividing the short sides spaced apart from each other in the second direction DR2. For example, the display area DA may be divided into a first sub-area AR1, a second sub-area AR2, a third sub-area AR3, a fourth sub-area AR4, a fifth sub-area AR5, a sixth sub-area AR6, a seventh sub-area AR7, an eighth sub-area AR8, and a ninth sub-area AR9 by the boundary lines BL1 and BL2. For example, the boundary line BL1 may divide the first, second and third sub-areas AR1, AR2 and AR3 from the fourth, fifth and sixth sub-areas AR4, AR5 and AR6. In addition, the boundary line BL2 may divide the first, fourth and seventh sub-areas AR1, AR4 and AR7 from the second, fifth and eighth sub-areas AR2, AR5 and AR8.

Specifically, a plurality of sub-areas may include the first sub-area AR1, the second sub-area AR2, and the third sub-area AR3, which are sequentially arranged in the first direction DR1. A plurality of sub-areas may include the fourth sub-area AR4, the fifth sub-area AR5, and the sixth sub-area AR6, which are sequentially arranged in the first direction DR1. A plurality of sub-areas may include the seventh sub-area AR7, the eighth sub-area AR8, and the ninth sub-area AR9, which are sequentially arranged in the first direction DR1.

In addition, a plurality of sub-areas may include the first sub-area AR1, the fourth sub-area AR4, and the seventh sub-area AR7, which are sequentially arranged in the second direction DR2. A plurality of sub-areas may include the second sub-area AR2, the fifth sub-area AR5, and the eighth sub-area AR8, which are sequentially arranged in the second direction DR2. A plurality of sub-areas may include the third sub-area AR3, the sixth sub-area AR6, and the ninth sub-area AR9, which are sequentially arranged in the second direction DR2.

However, in FIG. 8, it is illustrated that the display area DA is divided into nine sub-areas AR1 to AR9. However, this is merely an example, and the number of a plurality of sub-areas is not limited thereto.

Referring to FIGS. 7 and 8, a noise level caused in the touch sensor TS may be represented differently for each of the plurality of sub-areas AR1 to AR9 included in the display area DA. Accordingly, the insulating layer 110 may be formed with different thicknesses T according to the plurality of sub-areas AR1 to AR9. In other words, the thickness T of the plurality of sub-areas AR1 to AR9 may vary. In embodiments, when a halftone mask is used in a photo exposure process, the thickness T of the insulating layer 110 may be formed in two stages. The display area DA may be divided into two sub-areas. For example, the display area DA may be divided into two sub-areas according to the noise level that has an influence on the touch sensor TS. Specifically, the display area DA may be divided into sub-areas of a first group, in which the insulating layer 110 has a first thickness, and sub-areas of a second group, in which the insulating layer 110 has a second thickness, depending on noise levels. For example, the sub-areas of the first group may include the first sub-area AR1, the second sub-area AR2, the third sub-area AR3, the fourth sub-area AR4, the fifth sub-area AR5, and the sixth sub-area AR6, which are disposed on a first row and a second row in the first direction DR1. The sub-areas of the first group may have a relatively high noise level. In addition, the sub-areas of the second group may include the seventh sub-area AR7, the eighth sub-area AR8, and the ninth sub-area AR9, which are disposed on a third row in the first direction DR1. The sub-areas of the second group may have a relatively low noise level.

For example, the sub-areas of the first group may include the first sub-area AR1, the second sub-area AR2, and the third sub-area AR3, which are disposed on the first row in the first direction DR1, and the fifth sub-area AR5 disposed on a second column in the second direction DR2 on the second row in the first direction DR1. The sub-areas of the first group may have a relatively high noise level. In addition, the sub-areas of the second group may include the fourth sub-area AR4 and the sixth sub-area AR6, which are disposed on a first column and a third column in the second direction DR2 on the second row in the first direction DR1, and the seventh sub-area AR7, the eighth sub-area AR8, and the ninth sub-area AR9, which are disposed on the third row in the first direction DR1. The sub-areas of the second group may have a relatively low noise level.

As such, the insulating layer 110 is formed with different thicknesses T in the plurality of sub-areas AR1 to AR9 divided depending on noise levels, so that the noise levels caused in the touch sensor TS can become uniform.

Figure 9:
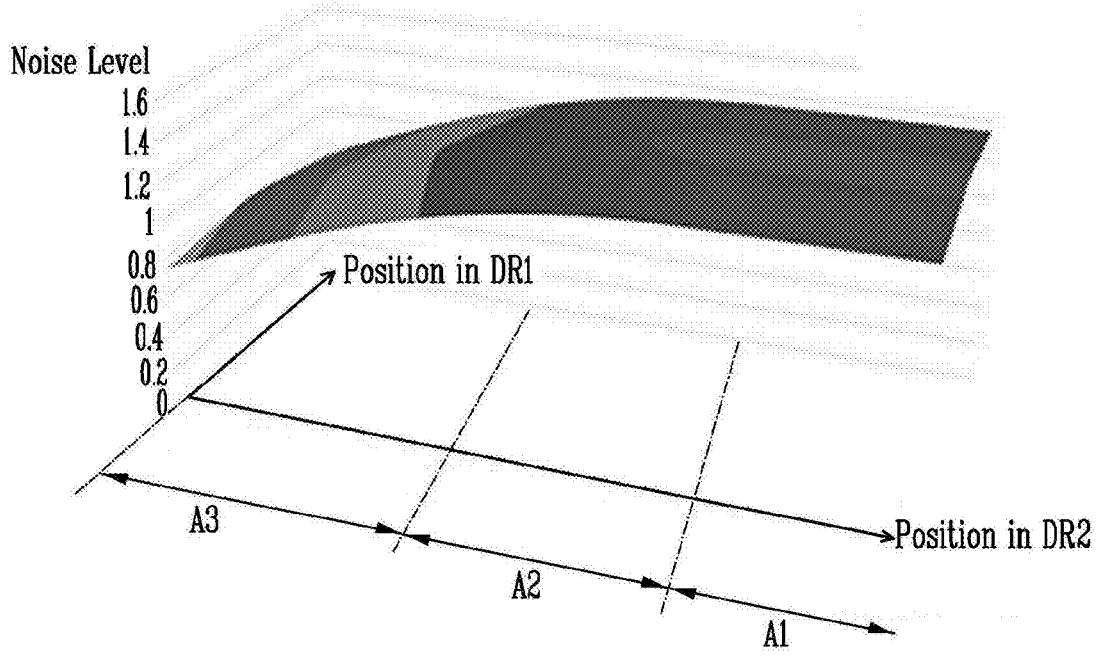
FIG. 9 is a graph illustrating an example of a level of noise for each sub-area, which may be generated by a display area.

FIG. 9 is a graph illustrating an example of a level of noise for each sub-area, which may be generated by the display area.

Referring to FIGS. 2, 8, and 9, noise may be sensed in the touch sensor TS disposed on the display panel DP due to a driving signal supplied to the display panel DP. The noise may be caused by an electrical signal applied to a plurality of sub-areas included in the display area DA when the display device DD is driven. The noise may be represented as a noise level corresponding to a peak voltage measured in the common electrode 122 (see FIG. 7). In addition, the noise level may be a degree of coupling between the source electrode 105 (see FIG. 7) and the common electrode 122 (see FIG. 7). For example, when the display area DA is divided into a first area A1, a second area A2, and a third area A3 according to a position thereof in the second direction DR2, the first area A1 may be an upper end area and the third area A3 may be a lower end area. A noise level of the first area A1 may be relatively higher than a noise level of each of the second area A2 and the third area A3. Additionally, the noise level of the second area A2 may be relatively higher than a noise level of the third area A3. Further, the noise level may be relatively high at a central portion in the first direction DR1 in each of a plurality of areas A1, A2, and A3.

Figure 10:
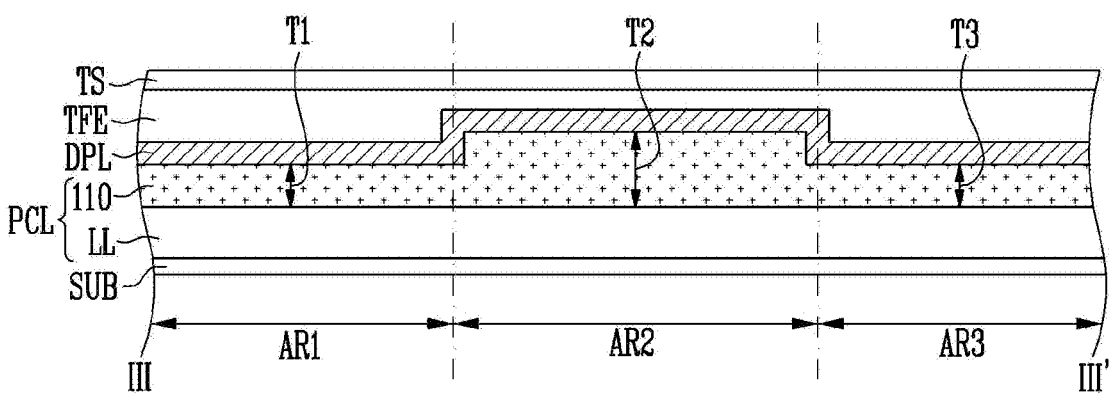
FIG. 10 is a sectional view illustrating an embodiment of the display device taken along line III-III' shown in FIG. 8.

FIG. 10 is a sectional view illustrating an embodiment of the display device taken along line III-III' shown in FIG. 8.

Referring to FIGS. 3 and 10, a pixel circuit layer PCL, a display element layer DPL, and a thin film encapsulation layer TFE may be disposed on a substrate SUB. The substrate SUB, the pixel circuit layer PCL, the display element layer DPL, and the thin film encapsulation layer TFE may be included in the display panel DP shown in FIG. 3. In addition, the pixel circuit layer PCL may include an insulating layer 110 and at least one lower layer LL. The lower layer LL may include sensing lines, a pixel driving circuit, and the like. A touch sensor TS may be disposed on the display panel DP.

A thickness T of the insulating layer 110 within the pixel circuit layer PCL may be adjusted to ensure that noise levels affecting the touch sensor TS are uniform. The line III-III' shown in FIG. 8 is a cutting line disposed in parallel to short sides spaced apart from each other in the second direction DR2, and thicknesses T1, T2, and T3 of the insulating layer 110, which respectively correspond to a plurality of sub-areas AR1, AR2, and AR3 sequentially arranged in the first direction DR1, may be described with reference to the sectional view shown in FIG. 10.

The thickness T of the insulating layer 110 may be in inverse proportion to the noise level affecting the touch sensor TS. The insulating layer 110 may be disposed to have a thicker thickness T as the sub-area has a higher noise level. For example, the thicknesses T1, T2, and T3 of the insulating layer 110 may be set with reference to noise levels caused by electrical signals of the plurality of sub-areas AR1, AR2, and AR3, respectively.

As shown in FIG. 8, the display area DA may have long sides which are disposed in parallel to each other and are spaced apart from each other in the first direction DR1 and short sides which are disposed in parallel to each other and are spaced apart from each other in the second direction DR2 intersecting the first direction DR1. In addition, a plurality of sub-areas into which the display area DA is divided may include the first sub-area AR1, the second sub-area AR2, and the third sub-area AR3, which are sequentially arranged in the first direction DR1. A noise level of the second sub-area AR2 disposed in a central portion in the first direction DR1 may be relatively higher than a noise level of each of the first sub-area AR1 and the third sub-area AR3. When the thickness T of the insulating layer 110 is constant in the first to third areas AR1 to AR3, a peak voltage generated in the common electrode 122 (see FIG. 7) when the first to third transistors T1 to T3 (see FIG. 7) are driven may be about 352 mV in the second sub-area AR2, and about 302 mV in each of the first sub-area AR1 and the third sub-area AR3. Due to this difference in the peak voltage, different noises in the respective first to third sub-areas AR1 to AR3 may be included in a signal of the touch electrodes 150 (see FIG. 7).

In accordance with an embodiment of the present disclosure, the insulating layer 110 may have a second thickness T2 in the second sub-area AR2, which is thicker than each of a first thickness T1 in the first sub-area AR1 and a third thickness T3 in the third sub-area AR3. Accordingly, a peak voltage which may be generated in the common electrode 122 when the first to third transistors TR1 to TR3 (see FIG. 7) are driven can become relatively uniform in the first to third sub-areas AR1 to AR3. Thus, a noise signal which may be included in the touch electrodes 150 can be relatively constant in the first to third sub-areas AR1 to AR3.

For example, different first, second and third thicknesses T1, T2, and T3 of the insulating layer 110 may have a range of 1 μm to 3 μm in a plurality of areas. For example, the first thickness T1 of the insulating layer 110 in the second sub-area AR2 may be about 2.4 μm, and each of the second thickness T2 of the insulating layer 110 in the first sub-area AR1 and the third thickness T3 of the insulating layer 110 in the third sub-area AR3 may be about 1.6 μm. However, the numerical values of the first to third thicknesses T1 to T3 are described as an example, and the present disclosure is not limited thereto.

Thus, the display panel DP includes the insulating layer 110 having a thickness T that is adjusted depending on a noise level of each of the plurality of sub-areas. When the insulating layer 110 having the adjusted thickness T is provided, noise levels in the display panel DP can be uniform. As such, display noise included in the signal of the touch sensor TS is uniform. Accordingly, the display noise can be effectively removed through a noise removal algorithm.

Figure 11:
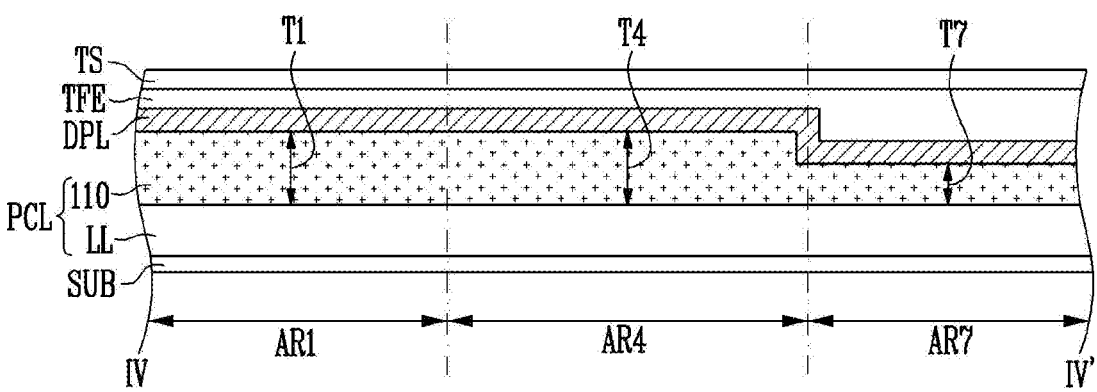
FIG. 11 is a sectional view illustrating an embodiment of the display device taken along line IV-IV' shown in FIG. 8.

FIG. 11 is a sectional view illustrating an embodiment of the display device taken along line IV-IV' shown in FIG. 8. The line IV-IV' shown in FIG. 8 is a cutting line disposed in parallel to long sides spaced apart from each other in the first direction DR1, and thicknesses T1, T4, and T7 of the insulating layer 110, which respectively correspond to a plurality of sub-areas AR1, AR4, and AR7 sequentially arranged in the second direction DR2, may be described in the sectional view shown in FIG. 11. Hereinafter, descriptions of portions overlapping with those shown in FIG. 10 may be omitted.

As shown in FIG. 8, the display area DA may have long sides which are disposed in parallel to each other and are spaced apart from each other in the first direction DR1 and short sides which are disposed in parallel to each other and are spaced apart from each other in the second direction DR2 intersecting the first direction DR1. In addition, a plurality of sub-areas into which the display area DA is divided may include the first sub-area AR1, the fourth sub-area AR4, and the seventh sub-area AR7, which are sequentially arranged in the second direction DR2. A noise level of each of the first sub-area AR1 and the fourth sub-area AR4, which are disposed at an upper end in the second direction DR2, may be relatively higher than a noise level of the seventh sub-area AR7. When the thickness T of the insulating layer 110 is constant in the first sub-area AR1, the fourth sub-area AR4, and the seventh sub-area AR7, a peak voltage generated in the common electrode 122 (see FIG. 7) when the first to third transistors TR1 to TR3 (see FIG. 7) are driven may be about 302 mV in the first sub-area AR1, about 280 mV in the fourth sub-area AR4, and about 152 mV in the seventh sub-area AR7. Due to such this difference in the peak voltages, different noises in the respective first, fourth, and seventh areas AR1, AR4, and AR7 may be included in a signal of the touch electrodes 150 (see FIG. 7).

In accordance with an embodiment of the present disclosure, the insulating layer 110 may be disposed such that each of a first thickness T1 in the first sub-area AR1 and a fourth thickness T4 in the fourth sub-area AR4 is thicker than a seventh thickness T7 in the seventh sub-area AR7. Accordingly, a peak voltage which may be generated in the common electrode 122 when the first to third transistors TR1 to TR3 (see FIG. 7) are driven can become relatively uniform in the first sub-area AR1, the fourth sub-area AR4, and the seventh sub-area AR7. Thus, a noise signal which may be included in the touch electrodes 150 can be relatively constant in the first sub-area AR1, the fourth sub-area AR4, and the seventh sub-area AR7.

Different first, fourth and seventh thicknesses T1, T4, and T7 of the insulating layer 110 may have a range of 1 μm to 3 μm in a plurality of areas. For example, each of the first thickness T1 of the insulating layer 110 in the first sub-area AR1 and the fourth thickness T4 of the insulating layer 110 in the fourth sub-area AR4 may be about 2.2 μm, and the seventh thickness T7 of the insulating layer 110 in the seventh sub-area AR7 may be about 1 μm.

More specifically, the first thickness T1 according to the noise level of the first sub-area AR1 may be about 2.4 μm, and the fourth thickness T4 according to the noise level of the fourth sub-area AR4 may be about 2.0 μm. However, when a halftone mask is used in a photo exposure process, the thickness T of the insulating layer 110 may be formed in two stages. Therefore, the first thickness T1 in the first sub-area AR1 and the fourth thickness T4 in the fourth sub-area AR4, except the seventh sub-area AR7, may be adjusted to be the same. The first thickness T1 and the fourth thickness T4 may be set to have an average thickness calculated using an area ratio of the first sub-area AR1 and the fourth sub-area AR4. The calculated average thickness may be about 2.2 μm. However, the numerical values of the corresponding thicknesses are described as an example, and the present disclosure is not limited thereto.

Thus, the display panel DP includes the insulating layer 110 having a thickness T adjusted depending on a noise level of each of the plurality of sub-areas. As the insulating layer 110 having the adjusted thickness T is provided, noise levels in the display panel DP can be made uniform. In other words, the uniformity of the touch sensor TS can be improved without changing any resistance design of touch electrodes. Thus, since the uniformity of the touch sensor TS is improved, display noise included in the signal of the touch sensor TS is uniformly formed. Accordingly, the display noise can be effectively removed through a noise removal algorithm.

In accordance with the present disclosure, there is provided a display device capable of recognizing a touch input with improved reliability by minimizing the influence of display noise introduced to a touch sensor.

Example embodiments of the present disclosure have been disclosed herein, and although specific terms were employed, they are used and are to be interpreted in a generic and descriptive sense and not for purpose of limitation. Furthermore, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made to the embodiments without departing from the spirit and scope of the present disclosure as set forth in the following claims.

What is claimed is:

1. A display device comprising:
a display panel including a display area; and
a touch array disposed on the display panel,
wherein the display panel includes:
a substrate;
transistors disposed on the substrate;
an insulating layer covering first electrodes and second electrodes of the transistors;
light emitting elements disposed on the insulating layer, the light emitting elements being electrically connected to the first electrodes of the transistors; and
a thin film encapsulation layer covering the light emitting elements,
wherein the display area is divided into a plurality of sub-areas, and
wherein the insulating layer has different thicknesses in the plurality of sub-areas.

2. The display device of claim 1, wherein the thicknesses of the insulating layer in the plurality of sub-areas are determined based on noise levels in signals of the touch array, wherein the noise levels are caused by electrical signals in the plurality of sub-areas when the display device is driven.

3. The display device of claim 1, wherein the thicknesses of the insulating layer in the plurality of sub-areas are set so that noise levels, which are respectively caused by electrical signals in the plurality of sub-areas, become uniform.

4. The display device of claim 1, wherein the display area has long sides which are disposed in parallel to each other and are spaced apart from each other in a first direction and short sides which are disposed in parallel to each other and are spaced apart from each other in a second direction intersecting the first direction, wherein the plurality of sub-areas include a first sub-area, a second sub-area, and a third sub-area, which are sequentially arranged in the first direction, and wherein the thickness of the insulating layer in the second sub-area is thicker than each of the thicknesses of the insulating layer in the first sub-area and the third sub-area.

5. The display device of claim 1, wherein the display area has long sides which are disposed in parallel to each other and are spaced apart from each other in a first direction and short sides which are disposed in parallel to each other and are spaced apart from each other in a second direction intersecting the first direction, wherein the plurality of sub-areas include a first sub-area and a second sub-area, which are sequentially arranged in the second direction, and wherein the thickness of the insulating layer in the first sub-area is thicker than the thickness of the insulating layer in the second sub-area.

6. The display device of claim 1, wherein each of the light emitting elements includes:

a pixel electrode disposed on the insulating layer, the pixel electrode being electrically connected to one of the first electrodes of the transistors;

a light emitting layer disposed on the pixel electrode; and a common electrode disposed on the light emitting layer.

7. The display device of claim 1, wherein the insulating layer includes an organic material.

8. The display device of claim 1, wherein the insulating layer has a thickness in a range of 1 μm to 3 μm.

9. A display device comprising: a display panel including a display area; and a touch array disposed on the display panel, wherein the display panel includes: a pixel circuit layer including a plurality of transistors; light emitting elements disposed on the pixel circuit layer, the light emitting elements being respectively connected to the plurality of transistors; and an insulating layer disposed between the pixel circuit layer and the light emitting elements, wherein the display area includes a plurality of sub-areas, and wherein the insulating layer has different thicknesses in the plurality of sub-areas.

10. The display device of claim 9, wherein the thicknesses of the insulating layer in the plurality of sub-areas are determined based on noise levels in signals of the touch array, wherein the noise levels are caused by electrical signals in the plurality of sub-areas when the display device is driven.

11. The display device of claim 9, wherein the thicknesses of the insulating layer in the plurality of sub-areas are set so that noise levels, which are respectively caused by electrical signals in the plurality of sub-areas, become uniform.

12. The display device of claim 9, wherein the display area has first sides which are disposed in parallel to each other and are spaced apart from each other in a first direction and second sides which are disposed in parallel to each other and are spaced apart from each other in a second direction intersecting the first direction, wherein the plurality of sub-areas include a first sub-area, a second sub-area, and a third sub-area, which are sequentially arranged in the first direction, and wherein the thickness of the insulating layer in the second sub-area is thicker than each of the thicknesses of the insulating layer in the first sub-area and the third sub-area.

13. The display device of claim 9, wherein the display area has first sides which are disposed in parallel to each other and are spaced apart from each other in a first direction and second sides which are disposed in parallel to each other and are spaced apart from each other in a second direction intersecting the first direction, wherein the plurality of sub-areas include a first sub-area and a second sub-area, which are sequentially arranged in the second direction, and wherein the thickness of the insulating layer in the first sub-area is thicker than the thickness of the insulating layer in the second sub-area.

14. The display device of claim 9, wherein the display panel further includes a thin film encapsulation layer covering the light emitting elements.

15. The display device of claim 9, wherein each of the light emitting elements includes:

a pixel electrode disposed on the insulating layer, the pixel electrode being electrically connected to one first electrode of one of the transistors;

a light emitting layer disposed on the pixel electrode; and a common electrode disposed on the light emitting layer.

16. A display device comprising:

a display panel including a display area; and a touch array disposed on the display panel, wherein the display panel includes:

a substrate;

transistors disposed on the substrate;

an insulating layer covering the transistors;

light emitting elements disposed on the insulating layer, the light emitting elements being electrically connected to the transistors; and a thin film encapsulation layer covering the light emitting elements, wherein the display area includes a first sub-area and a second sub-area, and wherein the insulating layer has a different thicknesses in the first sub-area and the second sub-area.

17. The display device of claim 16, wherein the display area further includes a third sub-area.

18. The display device of claim 17, wherein the first, second and third sub-areas are arranged in sequence and the thickness of the second sub-area is greater than the thickness of the first sub-area and a thickness of the third sub-area.

19. The display device of claim 17, wherein the first, second and third sub-areas are arranged in sequence and the thickness of each of the first and second sub-areas is greater than a thickness of the third sub-area.

20. The display device of claim 19, wherein the first and second sub-areas have the same thickness.

* * * * *